United States Patent
Lee et al.

(10) Patent No.: US 11,393,228 B2
(45) Date of Patent: Jul. 19, 2022

(54) METHODS, SYSTEMS, ARTICLES OF MANUFACTURE AND APPARATUS TO GENERATE DIGITAL SCENES

(71) Applicant: Movidius Ltd., Schiphol-Rijk (NL)

(72) Inventors: Kevin Lee, Dublin (IE); Anton Shmatov, Dublin (IE); Jonathan Byrne, Ashbourne (IE); David Moloney, Dublin (IE)

(73) Assignee: Movidius Limited, Schiphol-Rijk (NL)

( * ) Notice: Subject to any disclaimer, the term of this patent is extended or adjusted under 35 U.S.C. 154(b) by 0 days.

(21) Appl. No.: 17/040,876

(22) PCT Filed: Mar. 28, 2019

(86) PCT No.: PCT/EP2019/057961
§ 371 (c)(1),
(2) Date: Sep. 23, 2020

(87) PCT Pub. No.: WO2019/185852
PCT Pub. Date: Oct. 3, 2019

(65) Prior Publication Data
US 2021/0027044 A1 Jan. 28, 2021

Related U.S. Application Data

(60) Provisional application No. 62/650,722, filed on Mar. 30, 2018.

(51) Int. Cl.
*G06K 9/00* (2022.01)
*G06T 17/20* (2006.01)
(Continued)

(52) U.S. Cl.
CPC ............ *G06V 20/653* (2022.01); *G06T 17/20* (2013.01); *G06T 19/00* (2013.01); *G06V 10/56* (2022.01);
(Continued)

(58) Field of Classification Search
CPC ......... G06T 19/00; G06T 17/20; G06T 17/00; G06T 15/10; G06T 15/00; G06T 11/001;
(Continued)

(56) References Cited

U.S. PATENT DOCUMENTS

| 2012/0071244 A1* | 3/2012 | Gillo | A63F 13/00 463/42 |
| 2016/0027191 A1* | 1/2016 | Wang | G06T 7/90 345/600 |

(Continued)

FOREIGN PATENT DOCUMENTS

JP            5211069          6/2013

OTHER PUBLICATIONS

International Searching Authority, "International Search Report and Written Opinion," mailed in connection with International Patent Application No. PCT/EP2019/057961, dated Nov. 6, 2019, 23 pages.

(Continued)

*Primary Examiner* — Todd Buttram
(74) *Attorney, Agent, or Firm* — Hanley, Flight & Zimmerman, LLC

(57) ABSTRACT

Methods, systems, articles of manufacture and apparatus to generate digital scenes are disclosed. An example apparatus to generate labelled models includes a map builder to generate a three-dimensional (3D) model of an input image, a grouping classifier to identify a first zone of the 3D model corresponding to a first type of grouping classification, a human model builder to generate a quantity of placeholder human models corresponding to the first zone, a coordinate engine to assign the quantity of placeholder human models to respective coordinate locations of the first zone, the respective coordinate locations assigned based on the first type of grouping classification, a model characteristics (Continued)

modifier to assign characteristics associated with an aspect type to respective ones of the quantity of placeholder human models, and an annotation manager to associate the assigned characteristics as label data for respective ones of the quantity of placeholder human models.

24 Claims, 8 Drawing Sheets

(51) Int. Cl.
*G06K 9/46* (2006.01)
*G06T 19/00* (2011.01)
*G06V 20/64* (2022.01)
*G06V 10/56* (2022.01)
*G06V 20/52* (2022.01)

(52) U.S. Cl.
CPC ........ *G06V 20/53* (2022.01); *G06T 2219/004* (2013.01)

(58) Field of Classification Search
CPC .. G09G 5/02; G09G 5/10; G09G 5/06; G09G 2320/0666; G09G 2320/0626
See application file for complete search history.

(56) References Cited

U.S. PATENT DOCUMENTS

2017/0344127 A1* 11/2017 Hu ..................... A63F 13/655
2021/0027044 A1* 1/2021 Lee ..................... G06K 9/6259

OTHER PUBLICATIONS

Thompson et al., "A Computer Model for the Evacuation of Large Building Populations," Fire Safety Journal, 24, 1995, 18 pages.
Maim et al., "Populating Ancient Pompeii with Crowds of Virtual Romans," Eurographics, 0, 1981, 8 pages.
Cheung et al., "LCrowdV: Generating Labeled Videos for Simulation-Based Crowd Behavior Learning," ECCV 2016 Workshops, Part 2, LNCS 9914, 2016, 19 pages.

* cited by examiner

METHODS, SYSTEMS, ARTICLES OF MANUFACTURE AND APPARATUS TO GENERATE DIGITAL SCENES

CROSS-REFERENCE TO RELATED APPLICATION

This patent application arises from a 371 nationalization of PCT Patent Application No. PCT/EP2019/057961, entitled "METHODS, SYSTEMS, ARTICLES OF MANUFACTURE AND APPARATUS TO GENERATE DIGITAL SCENES," and which was filed on Mar. 28, 2019, which claims priority to U.S. Provisional Patent Application Ser. No. 62/650,722, which was filed on Mar. 30, 2018. PCT Patent Application No. PCT/EP2019/057961 and U.S. Provisional Patent Application Ser. No. 62/650,722 are hereby incorporated herein by reference in their entireties. Priority to PCT Patent Application No. PCT/EP2019/057961 and U.S. Provisional Patent Application Ser. No. 62/650,722 is hereby claimed.

FIELD OF THE DISCLOSURE

This disclosure relates generally to network training, and, more particularly, to methods, systems, articles of manufacture and apparatus to generate digital scenes.

BACKGROUND

In recent years, neural networks have been utilized to aid in the analysis of scenes. In some examples, neural networks aid in the identification and/or classification of emerging patterns, such as patterns related to crowd behavior.

Figure 1:
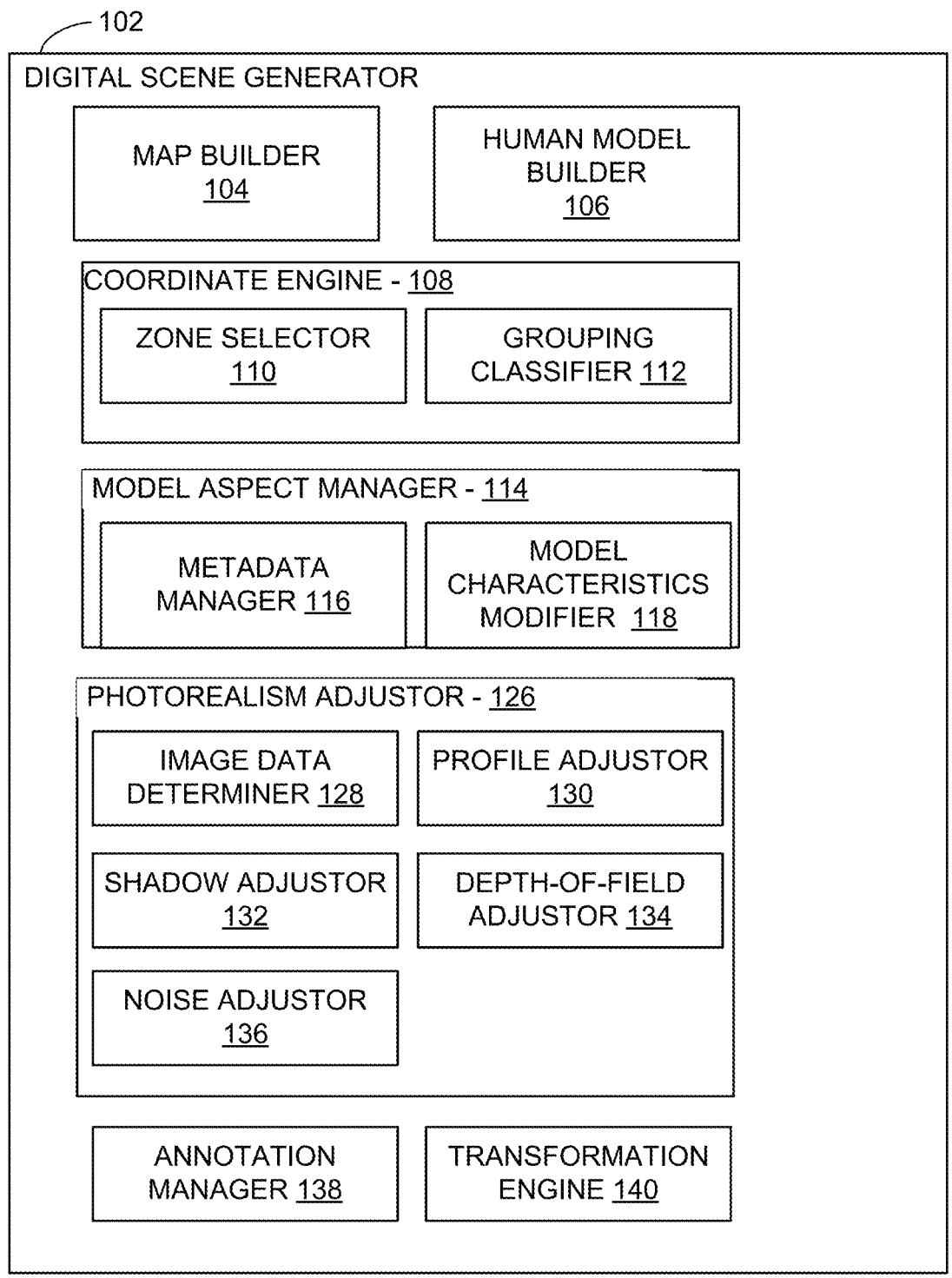
FIG. 1 is a schematic illustration of an example digital scene generator to generate a digital scene with labelled human models.

The figures are not to scale. In general, the same reference numbers will be used throughout the drawing(s) and accompanying written description to refer to the same or like parts. Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Crowd estimation has a wide range of applications, which include computer vision applications, robotics applications and security surveillance applications. Computer vision techniques and deep learning technologies have enabled large scale crowd estimation, but advances in such techniques have been hindered by a lack of high quality, annotated (labelled) and publicly available datasets. Tasks related to crowd counting, crowd segmentation and crowd tracking may be assisted with convolutional neural network (CNN) techniques, but such techniques require a large amount of labelled data to perform well. While many publicly-placed cameras obtain images (e.g., high resolution images) of scenes having large amounts of people, such images require tedious labelling tasks to aid with one or more machine learning tasks (e.g., those involving CNN techniques). Additionally, even if the people within those publicly-available scenes were labelled, some privacy laws block the release of real-world footage for private and/or public use. For instance, crowd videos captured from surveillance cameras (e.g., closed-captioned television (CCTV)) are seldom released for public use in view of General Data Protection Regulation (GDPR) legislation, under which release forms are required from individuals whose personal information is captured in an image.

In the event crowd data is available for which all privacy regulations are met and tedious labelling efforts have occurred, such crowd data is typically limited to a particular scene. Stated differently, a variety of scenes on which to perform machine learning analysis on crowds is not readily available, thus crowd research managers have limited flexibility. Furthermore, crowd labelling efforts are typically performed by disparate teams of human beings. Typically, human-based labelling efforts suffer from bias, inaccuracy and fatigue. Moreover, multiple different human annotators lead to inconsistencies within the labelled data, which may lead to ground truth reliance issues.

Examples disclosed herein generate photo-realistic scalable labelled synthetic crowds and/or synthetic images including crowds for the purpose of, in part, accelerating crowd understanding techniques and machine learning efforts. In some examples, human models are generated on scene reconstructed environments. The human models are tailored to satisfy design requirements (e.g., quantity and type of gender, walking, running, face orientation, clothing types, etc.) and corresponding labelling characteristics are retained and/or otherwise associated with each human model without human annotator participation. In some examples, the scene reconstructed environments are created with footage captured by aerial drone surveys, and then crowds are composited with original images to generate photo-realistic data.

FIG. 1 is a schematic illustration of an example digital scene generator 102 to enable generating digital scenes with labelled human models. In the illustrated example of FIG. 1, the digital scene generator 102 includes an example map builder 104, an example human model builder 106, and an example coordinate engine 108. The example coordinate engine 108 of FIG. 1 includes an example zone selector 110 and an example grouping classifier 112. The example digital scene generator 102 also includes an example model aspect manager 114, which includes an example metadata manager 116 and an example model characteristic modifier 118. The example digital scene generator 102 also includes an example photorealism adjustor 126, which includes an example image data determiner 128, an example profile adjustor 130, an example shadow adjustor 132, an example depth-of-field adjustor 134, and an example noise adjustor 136. The example digital scene generator 102 also includes an example annotation manager 138 and an example transformation engine 140. In this example, the map builder 104 implements means for map building. The means for map building may additionally or alternatively be implemented by map building means. In this example, the human model builder 106 implements means for human model building. The means for human model building may additionally or alternatively be implemented by human model building means. In this example, the coordinate engine 108 implements means for coordinate assigning. The means for coordinate assigning may additionally or alternatively be implemented by coordinate assigning means. In this example, the zone selector 110 implements means for zone selecting. The means for zone selecting may additionally or alternatively be implemented by zone selecting means. In this example, the grouping classifier 112 implements means for grouping. The means for grouping may additionally or alternatively be implemented by grouping means. In this example, the model aspect manager 114 implements means for aspect modification. The means for aspect modification may additionally or alternatively be implemented by aspect modification means. In this example, the metadata manager 116 implements means for managing metadata. The means for managing metadata may additionally or alternatively be implemented by metadata managing means. In this example, the model characteristic modifier 118 implements means for model characteristics modification. The means for model characteristics modification may additionally or alternatively be implemented by model characteristics modification means. In this example, the photorealism adjustor 126 implements means for photorealism adjusting. The means for photorealism adjusting may additionally or alternatively be implemented by photorealism adjusting means. In this example, the image data determiner 128 implements means for image data determining. The means for image data determining may additionally or alternatively be implemented by image data determining means. In this example, the profile adjustor 130 implements means for profile adjusting. The means for profile adjusting may additionally or alternatively be implemented by profile adjusting means. In this example, the shadow adjustor 132 implements means for shadow adjusting. The means for shadow adjusting may additionally or alternatively be implemented by shadow adjusting means. In this example, the depth-of-field adjustor 134 implements means for depth-of-field adjusting. The means for depth-of-field adjusting may additionally or alternatively be implemented by depth-of-field adjusting means. In this example, the noise adjustor 136 implements means for noise adjusting. The means for noise adjusting may additionally or alternatively be implemented by noise adjusting means. In this example, the annotation manager 138 implements means for annotation. The means for annotation may additionally or alternatively be implemented by annotation means. In this example, the transformation engine 140 implements means for transformation. The means for transformation may additionally or alternatively be implemented by transformation means.

In operation, the example map builder 104 generates a model from an input image. The example input image is sometimes referred to as a background scene. The input image may include one or more images (e.g., stereoscopic images) from different angles and/or points of view, such as one or more images from video footage of a scene of interest (e.g., a park, a school campus, etc.). Such video footage may originate from aerial drone data capture, in which three-dimensional (3D) models are constructed (e.g., as a 3D mesh) via one or more motion methodology techniques. 3D models allow a coordinate mapping reference of the scene of interest, in which the coordinate mapping provides an ability to measure, calculate and/or otherwise identify distance information between one or more objects of the scene of interest (e.g., distance values associated with a length of a road, a height of a building, dimensions of greenspace, etc.). While the example 3D model generated by the example map builder 104 is based on the one or more images of the scene of interest, the 3D model (e.g., the 3D mesh) includes one or more object file formats, and is represented as a geolocated point cloud. In some examples, the generated point cloud includes discrete geolocated coordinate points of different aspects of the scene of interest, such as coordinate points indicative of road boundaries, building boundaries, etc. In some examples, the 3D object file format is supported by one or more rendering applications, such as Blender®, Cycles Renderer®, etc. As such, the geolocated point cloud may not include shading, coloring and/or other imagery that is typically associated with photorealism characteristics suitable for machine learning and/or training. Examples disclosed herein insert human models into the 3D model and, to improve one or more photorealism characteristics in a manner suitable for machine learning, overlay the scene of interest (e.g., originally captured image(s)) onto the 3D model, as described in further detail below.

In some examples, captured images from the scene of interest include lighting conditions unique to a particular sun position (e.g., if outdoors) or no sun position at all. In such examples, the captured images may also include shadows for one or more objects within the scene of interest (e.g., shadows caused by buildings, shadows caused by trees, shadows caused by vehicles, etc.). As described in further detail below, in an effort to improve a degree of photorealism for machine learning, examples disclosed herein insert human models into the 3D model in a manner consistent with lighting conditions associated with the original scene of interest.

The example map builder 104 retrieves 3D model input (e.g., from a user) to cause insertion of human models into the scene of interest. In some examples, the map builder 104 retrieves zone information indicative of different zones of the scene of interest that are to include placement of human models subject to different distance constraints. Map/model input may originate from user input on the 3D model in the form of painting, highlighting and/or otherwise identifying particular regions/zones of the 3D model with particular colors, in which each color represents a type of human model characteristic (e.g., particular types of grouping classifications). For example, some zones of the 3D map correspond to a first grouping classification (e.g., a particular zone was painted a particular color corresponding to the first grouping classification), while other zones correspond to a second grouping classification. In some examples, the map builder 104 obtains such map input zone details in conjunction with a particular quantity of human models that are to be inserted in the respective zone (e.g., insert a relatively low quantity of human models in a first zone associated with a lawn picnic, insert a relatively high quantity of human models in a second zone associated with a concert, etc.). An example first grouping classification includes a co-dependent placement grouping type, in which human models to be inserted into the first zone have a relationship with adjacent human models of that zone. Examples of the co-dependent placement grouping type classification include groups of people having a picnic (e.g., on a greenspace zone of the scene of interest), groups of people watching a concert, groups of people marching in a parade, etc. Different grouping classification types (e.g., the co-dependent placement grouping type) include different threshold distances between adjacent members in that zone, such as adjacent members relatively close to one another during a picnic, a concert, a parade, etc. Alternatively, an independent placement grouping type is indicative of human models to be inserted into a zone (e.g., a second zone) that do not have a relationship with adjacent human models. For example, people (represented by human models on the 3D model) walking along a sidewalk or sitting alone on a park bench are not behaving in a coordinated manner with other people that might be adjacent to them in that particular zone. As such, a relative distance between adjacent human models associated with the independent grouping type may be greater than such distances observed between human models in the co-dependent grouping type.

Figure 2:
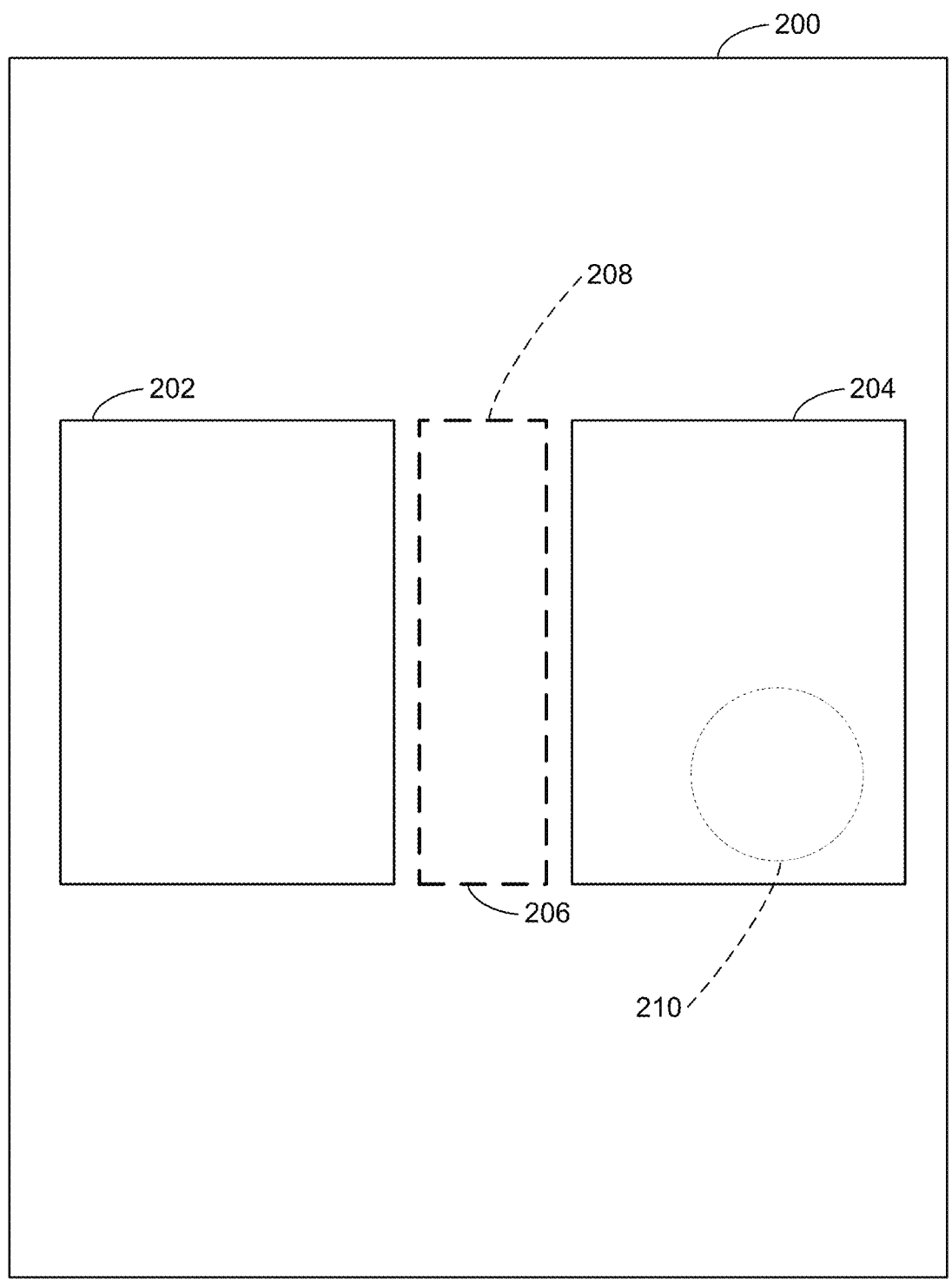
FIG. 2 is a schematic illustration of an example zone map analyzed by the example digital scene generator of FIG. 1.

FIG. 2 is an example zone map 200 analyzed by the example map builder 104 when retrieving, receiving and/or otherwise obtaining input and/or instructions regarding human model placement. In the illustrated example of FIG. 2, the zone map 200 includes a first greenspace area 202, a second greenspace area 204, and a walking path 206. The example walking path 206 includes a first region of interest (ROI) 208 indicative of a zone associated with the independent grouping classification. The example first ROI 208 may have been identified by a prior user painting effort on the example zone map 200. As such, placement of human models in the first ROI 208 exhibits a first distance threshold value therebetween. Such first distance threshold placements of the human models more accurately represent individual people behaving in a manner independent of one another, such as individuals walking to work, walking to a class, etc. In some examples, placement of human models associated with the independent grouping classification will also exhibit a pose orientation associated with an expected direction of travel, such as a pose orientation parallel to the example walking path 206. Some human models may exhibit a pose 180 degrees opposite of one or more adjacent human models to represent people moving in different directions along the walking path 206.

In the illustrated example of FIG. 2, the second greenspace area 204 includes a second ROI 210 indicative of a zone associated with the co-dependent grouping classification. As such, human models placed in the second ROI 210 exhibit a second distance threshold value therebetween. Such second distance threshold placements of the human models more accurately represent groups of people that have a degree of interaction, such as people attending a concert, having a picnic or walking in a parade. Typically, such people will have a relatively smaller distance therebetween, particularly in very crowded concerts, parades, etc. In some examples, placement of human models associated with the co-dependent grouping classification will also exhibit a pose orientation toward a similar focal point (e.g., a center of a stage during a concert), or a focal point central to a group of people in a generally circular formation (e.g., people facing each other during a picnic). Examples disclosed herein enable the acquisition of such desired zones, particular grouping classifications and/or particular pose details. Using such acquired information from the example zone map 200, human model placement is performed in a more realistic manner, thereby improving one or more machine learning training operations.

The example zone selector 110 selects a particular zone of interest from the 3D model (e.g., the example zone map 200 of FIG. 2), and the example human model builder 106 generates a number of placeholder human models based on a target quantity for the selected zone. As used herein, placeholder human models represent human models that are not yet tailored to include particular characteristics of an aspect type. In some examples, placeholder human models include coordinate locations of human models placed on respective coordinate positions of the 3D model (e.g., 3D mesh) of the scene of interest, in which such placeholder human models are devoid of the aspect characteristics. In some examples, the respective coordinate positions of the human models are selected in a random manner to improve a degree of photorealism. As used herein, an aspect type represents a particular characteristic grouping of a human model. Example aspect types include, but are not limited to a race aspect, a gender aspect, an age aspect, a height aspect, a muscle aspect, a weight aspect, a pose aspect, a movement-type aspect (e.g., walking, running, sitting, etc.), or a clothing aspect. As used herein, a characteristic represents a particular aspect detail. For example, characteristics of the gender aspect may include, but are not limited to a female gender or a male gender. Example characteristics of the age aspect may include an integer value of an age of the human model, and example characteristics of the pose aspect include, but are not limited to an orientation, a standing pose, a sitting pose, a walking pose or a running pose.

The example grouping classifier 112 determines if a selected zone of interest (e.g., a zone from the example zone map 200) is associated with a co-dependent grouping classification. If so, the example coordinate engine 108 assigns respective placeholder human models to respective coordinate locations of the 3D model corresponding to constraints of the grouping classification type. In some examples, the coordinate engine 108 assigns the human model to a corresponding coordinate location and also aligns a facial orientation of the human model based on a reference focal point. For instance, if a number of human models corresponding to the co-dependent placement grouping classification are to simulate watching a concert, then the example coordinate engine 108 establishes an orientation of each human model facing the reference focal point of interest (e.g., a center of a stage in the example 3D model). In some examples, the coordinate engine 108 applies a variation factor to each placed human model so that the facial orientation (e.g., a directional orientation) is not too homogenous and/or artificial in appearance. In some examples, the coordinate engine 108 arranges each human model within a threshold orientation+/−x-degrees as determined by a random number generator. When all placeholder human models of a selected zone of interest have been assigned to corresponding coordinate locations of the 3D model, the example zone selector 110 determines whether the example 3D model includes one or more additional zones of interest that have not yet been processed for human model placement. In the event additional zones and/or human models are to be placed on the 3D model, the aforementioned process repeats accordingly. In some examples, a quantity of human models is placed on the 3D model based on user input information, such as a number of people to represent at a concert, a number of people to represent at a picnic, or a number of people to represent walking down a sidewalk/street.

After the example 3D model includes assignments of human models to corresponding coordinate locations, the example model aspect manager 114 assigns characteristics to the human models. The example model aspect manager 114 selects a human model from the 3D model, and the example metadata manager 116 extracts metadata associated with the selected human model. For example, metadata associated with respective human models may include, but are not limited to the grouping classification type (e.g., co-dependent, independent), an activity type (e.g., watching a concert, walking to work), with which zone the human model is associated, etc. While example human models may have certain metadata associated with the corresponding grouping classification type, additional metadata is added by examples disclosed herein to serve as label information that assists machine learning activities. The example model characteristic modifier 118 selects a candidate model aspect type. As described above, aspect types may include but are not limited to a race aspect, a gender aspect, an age aspect, a height aspect, a muscle aspect, a weight aspect, a pose aspect, a movement-type aspect (e.g., walking, running, sitting, etc.), or a clothing aspect.

The example model characteristic modifier 118 assigns a characteristic of the selected aspect type (e.g., "male" is selected from the aspect type "gender"), and the example metadata manager 116 adds, associates and/or otherwise stores the characteristic value (e.g., "male") as metadata to the selected human model (e.g., the human models may be stored within a data structure). In some examples, the example model characteristic modifier 118 utilizes a random number generator to randomly select a characteristic from each aspect type of interest. In still other examples, each candidate characteristic may be paired with co-characteristics that are typically deemed mutually exclusive, such as a male versus female characteristic, a pants versus shorts characteristic, a facial hair versus non-facial hair characteristic, etc. The example metadata manager 116 thus provides an equal chance of each particular characteristic being represented in a stochastic manner. As such, photorealism is improved for machine learning training by eliminating bias or skew caused by homogeneous characteristic selection. The example model characteristic modifier 118 determines whether there are one or more additional aspect types of interest to be considered for the selected human model and, if so, selects a next unexplored aspect type in a similar manner. When all possible aspect types have corresponding characteristics assigned to the human model, the example model aspect manager 114 selects a next human model for characteristic assignment.

While the example 3D model has a number of synthetically generated human models placed thereon at particular geographic coordinates, examples disclosed herein apply additional modifications to the human models to improve a degree of photorealism. The example photorealism adjustor 126 invokes one or more changes to the 3D model and/or human models therein. The example image data determiner 128 retrieves, receives and/or otherwise obtains characteristics associated with the scene of interest, which may include any number of images acquired from aerial drone photography tasks. In some examples, the image data determiner 128 retrieves frustum settings associated with the camera(s) responsible for the scene of interest. In some examples, the image data determiner 128 retrieves lighting information associated with respective images of the scene of interest, such as respective locations of the sun when the image(s) was taken, locations of light in a room, etc. Generally speaking, information related to source locations of light aid in the generation of realistic shadows for the human models such that shadows of those human models are consistent with respect to shadows captured by the camera(s) (e.g., shadows of buildings, trees, etc.) when taking the source image(s).

The example profile adjustor 130 adjusts the human model profiles based on source camera angle information. For instance, examples disclosed herein adjust the coordinate scaling of the human models based on source camera angle information so that the human models appear consistent with scene objects (e.g., trees, buildings, etc.). The example shadow adjustor 132 applies shadows to the human models based on shadow characteristics of the originally captured images of the scene of interest. Typically, because the captured images of the scene of interest are taken at a particular time of day, lighting conditions cause variations in shadows of objects within the scene. Accordingly, examples disclosed herein apply shadows to the human models in a manner consistent with shadows appearing on objects of the scene. The example depth of field adjustor 134 adjusts a depth-of-field characteristic of respective human models based on a desired focal point of the scene. The example noise adjustor 136 applies noise in an effort to improve photorealism. In some examples, one or more crowds are adjusted to appear out of focus to create a more photorealistic image. In some examples, pixilation is applied by the noise adjustor 136 on top of particular human models to remove smooth edges that occur as a result of synthetic rendering processes.

The example map builder 104 overlays the original images of the scene of interest over the 3D model (3D mesh) to create a synthetic image. As a result, a degree of photorealism of the synthetic image is improved because actual images of the scene of interest are used instead of rendering wireframe/mesh data of the 3D model. However, while the synthetic image now includes (a) actual images from the scene of interest overlaid upon (b) human models having characteristic metadata and 3D coordinate information (e.g., x-axis, y-axis, z-axis, projection-view data, model-view data), machine learning operations require two-dimensional (2D) coordinate information with associated label information. In some examples, the map builder 104 applies a watermark to the synthetic image to identify that all human images and/or human faces are simulated. Such watermarking may proactively subdue any concerns that the images are in violation of one or more jurisdictional laws/rules related to privacy (e.g., General Data Protection Regulation (GDPR)—Regulation (EU) 2016/679).

Examples disclosed herein facilitate scalable techniques to perform annotation tasks with pixel level accuracy. At least one advantage of using synthetic human model data (e.g., the human models generated by the example human model builder 106) and 3D models is the access to positional and dimensional information of all objects within the scene. Pixel co-ordinates of each character model in 2D space is obtained when rendered onto an image (e.g., a 3D projection). Example transformations are performed by the example transformation engine 140 in a manner consistent with example Equation 1.

$$P' = P*M(x,y,z,1)' \qquad \text{Equation 1.}$$

In the illustrated example of Equation 1, P and M represent a projection and model-view matrix, respectively. The point P' is normalized so that it can be mapped back (by the example transformation engine 140) onto the rendered synthetic map/image. Camera parameters are modelled similar to specifications found on industry-standard cameras, such as the example DJI Phantom 3 drone camera. Such images render from the model using a 94 degree field of view and 20 mm sensors. In view of varying heights of models, an annotated point is set by the example transformation engine 140 to a center of a body of interest. For each rendered human model, an accompanying pixel coordinate is provided by the example transformation engine 140 in vector form (U, V form, where U reflects a horizontal 2D dimension and V reflects a vertical 2D dimension) and written to, for example, a text file.

Stated differently, the example annotation manager 138 invokes the example model aspect manager 114 to select a human model from the 3D model (e.g., the synthetic image), and the example coordinate engine 108 extracts 3D coordinate information. The example transformation engine 140 transforms the 3D coordinate information to a 2D coordinate representation, as described above in a manner consistent with example Equation 1. The example metadata manager 116 embeds metadata to the 2D coordinate information as label data, which includes characteristics of different aspect types, activity types and/or grouping classification information. The example transformation engine 140 maps the human model to the 2D coordinate (e.g., U, V and characteristic label information) on the synthetic image. This process is repeated for any number of human models on the synthetic image such that subsequent machine learning operations may proceed in view of the scene of interest.

While an example manner of implementing the digital scene generator 102 of FIG. 1 is illustrated in FIGS. 1 and 2, one or more of the elements, processes and/or devices illustrated in FIG. 1 may be combined, divided, re-arranged, omitted, eliminated and/or implemented in any other way. Further, the example map builder 104, the example human model builder 106, the example coordinate engine 108, the example zone selector 110, the example grouping classifier 112, the example model aspect manager 114, the example metadata manager 116, the example model characteristic modifier 118, the example photorealism adjustor 126, the example image data determiner 128, the example profile adjustor 130, the example shadow adjustor 132, the example depth-of-field adjustor 134, the example noise generator 136, the example annotation manager 138, the example transformation engine 140 and/or, more generally, the example digital scene generator 102 of FIG. 1 may be implemented by hardware, software, firmware and/or any combination of hardware, software and/or firmware. Thus, for example, any of the example map builder 104, the example human model builder 106, the example coordinate engine 108, the example zone selector 110, the example grouping classifier 112, the example model aspect manager 114, the example metadata manager 116, the example model characteristic modifier 118, the example photorealism adjustor 126, the example image data determiner 128, the example profile adjustor 130, the example shadow adjustor 132, the example depth-of-field adjustor 134, the example noise generator 136, the example annotation manager 138, the example transformation engine 140 and/or, more generally, the example digital scene generator 102 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example map builder 104, the example human model builder 106, the example coordinate engine 108, the example zone selector 110, the example grouping classifier 112, the example model aspect manager 114, the example metadata manager 116, the example model characteristic modifier 118, the example photorealism adjustor 126, the example image data determiner 128, the example profile adjustor 130, the example shadow adjustor 132, the example depth-of-field adjustor 134, the example noise generator 136, the example annotation manager 138, the example transformation engine 140 and/or, more generally, the example digital scene generator 102 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example digital scene generator 102 of FIG. 1 may include one or more elements, processes and/or devices in addition to, or instead of, those illustrated in FIGS. 1 and/or 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the digital scene generator 102 of FIG. 1 are shown in FIGS. 3-7. The machine readable instructions may be one or more executable programs or portion(s) of an executable program for execution by a computer processor such as the processor 812 shown in the example processor platform 800 discussed below in connection with FIG. 8. The program(s) may be embodied in software stored on a non-transitory computer readable storage medium such as a CD-ROM, a floppy disk, a hard drive, a DVD, a Blu-ray disk, or a memory associated with the processor 812, but the entire program(s) and/or parts thereof could alternatively be executed by a device other than the processor 812 and/or embodied in firmware or dedicated hardware. Further, although the example program(s) is/are described with reference to the flowcharts illustrated in FIGS. 3-7, many other methods of implementing the example digital scene generator 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 3-7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 3:
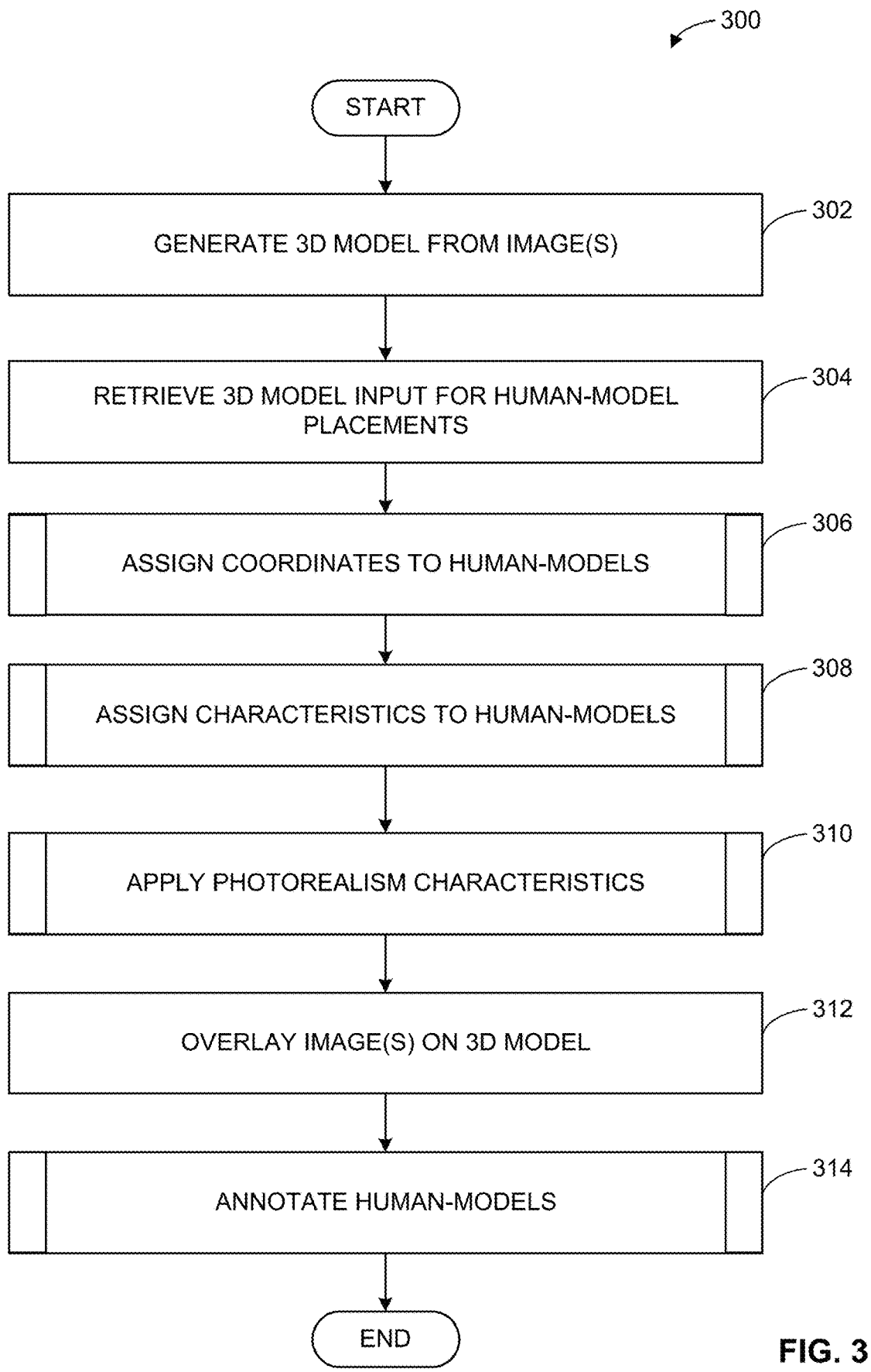
FIGS. 3-7 are flowcharts representative of machine readable instructions which may be executed to implement the example digital scene generator of FIG. 1 to generate digital scenes with labelled human models.

The program 300 of FIG. 3 includes block 302, where the example map builder 104 generates a 3D model from acquired images of interest. The example map builder 104 retrieves, receives and/or otherwise obtains input data associated with the generated 3D model regarding human model placements (block 304). As described above, one or more painted regions of the generated 3D model (e.g., a 3D mesh wireframe) are identified by the example map builder 104 to determine a particular grouping classification for placeholder human models. Such grouping classifications, in some examples, are organized on a zone-by-zone basis.

The example coordinate engine 108 assigns coordinates to human models (candidate human models that do not yet have one or more aspect characteristics associated therewith) (block 306). However, after a number of human models are added to the 3D model (block 306), the example model aspect manager 114 assigns characteristics to those human models (block 308). The example photorealism adjustor 126 applies one or more photorealism adjustments to the human models (block 310), and the example map builder 104 overlays the originally acquired image(s) on the 3D model to create a synthetic map/image of the scene of interest (block 312). With human models on the synthetic map in their respective assigned coordinates, the example annotation manager 138 annotates the human models (block 314).

Figure 4:
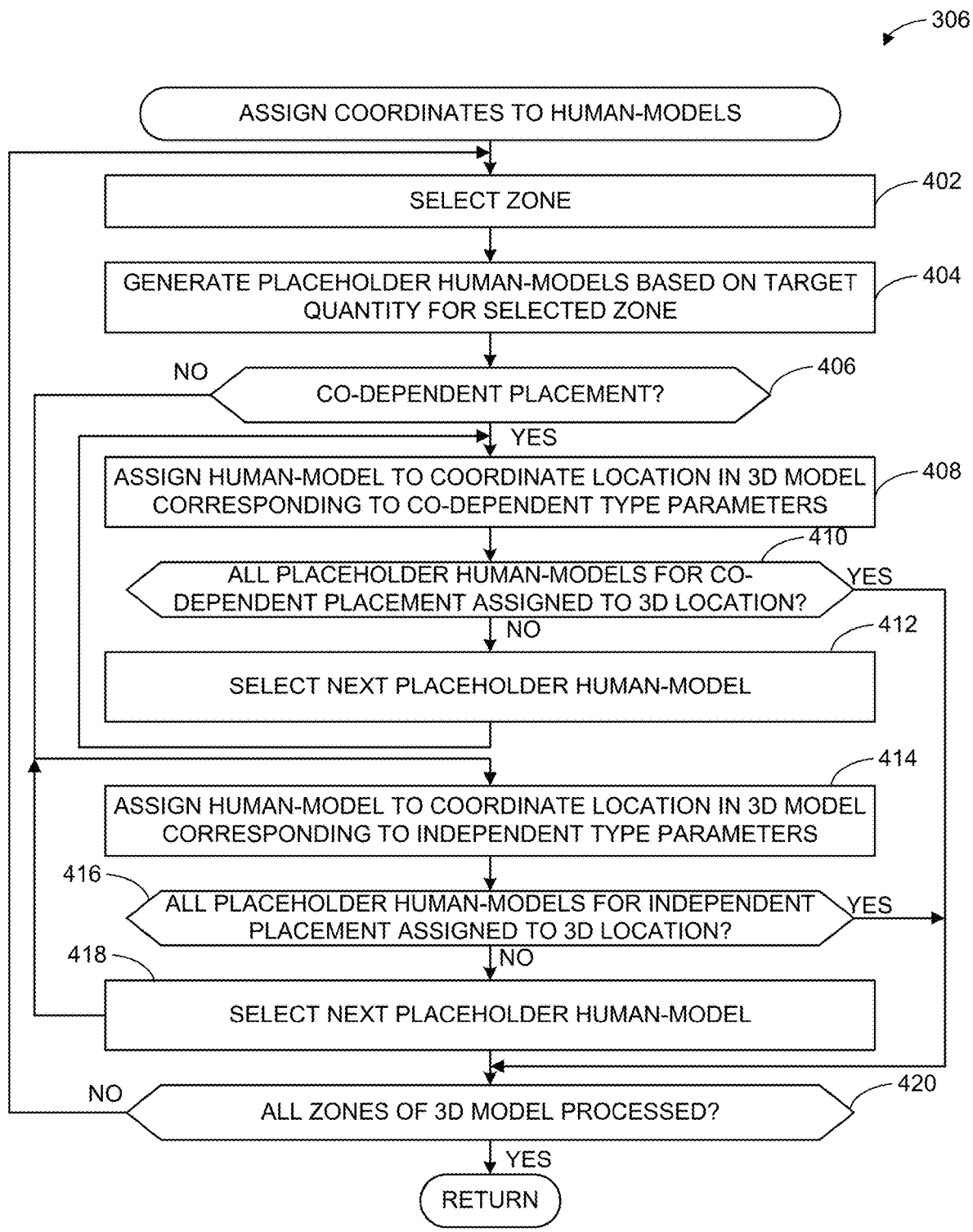

FIG. 4 illustrates additional detail of the example coordinate engine 108 assigning coordinates to the human models (block 306). In the illustrated example of FIG. 4, the example zone selector 110 selects one of the zones of interest from the 3D map (e.g., the example zone map 200 of FIG. 2) (block 402). Based on a type of the selected zone, the example human model builder 106 generates placeholder human models based on a target quantity associated with the selected zone (block 404). As described above, candidate human models are generated by the example human model builder 106 in a manner devoid of one or more characteristics so that such characteristics (e.g., attributes) can be selected in a more realistic manner (e.g., application of a statistical randomness to improve realistic crowd variety). The example grouping classifier 112 determines whether the selected zone and corresponding placeholder human models are associated with a co-dependent placement grouping classification (block 406). If so, the example coordinate engine 108 assigns the one of the human models to a coordinate location in the 3D model in a manner corresponding to the co-dependent placement grouping classification (block 408). The example grouping classifier 112 determines whether all placeholder human models for the co-dependent placement grouping classification have been assigned to a corresponding location and, if not (block 410), the human model builder 106 selects a next placeholder human model (block 412). Control then returns to block 408.

In the event the example grouping classifier 112 determines that the selected zone is not associated with the co-dependent placement grouping classification (block 406), then the example coordinate engine 108 assigns one of the human models to a corresponding coordinate location in the 3D model corresponding to an independent placement grouping classification (block 414). The example grouping classifier 112 determines whether all placeholder human models associated with the independent placement grouping classification have been assigned (block 416) and if not, the human model builder 106 selects a next one of the placeholder human models (block 418). Control returns to block 414 to assign the selected placeholder human model a corresponding coordinate location based on the independent placement grouping classification. When all of the candidate placeholder human models have been processed (see blocks 410 and 416), the example zone selector 110 determines whether all zones of the 3D model have been processed (block 420). If not, control returns to block 402 to select another zone of interest.

Figure 5:
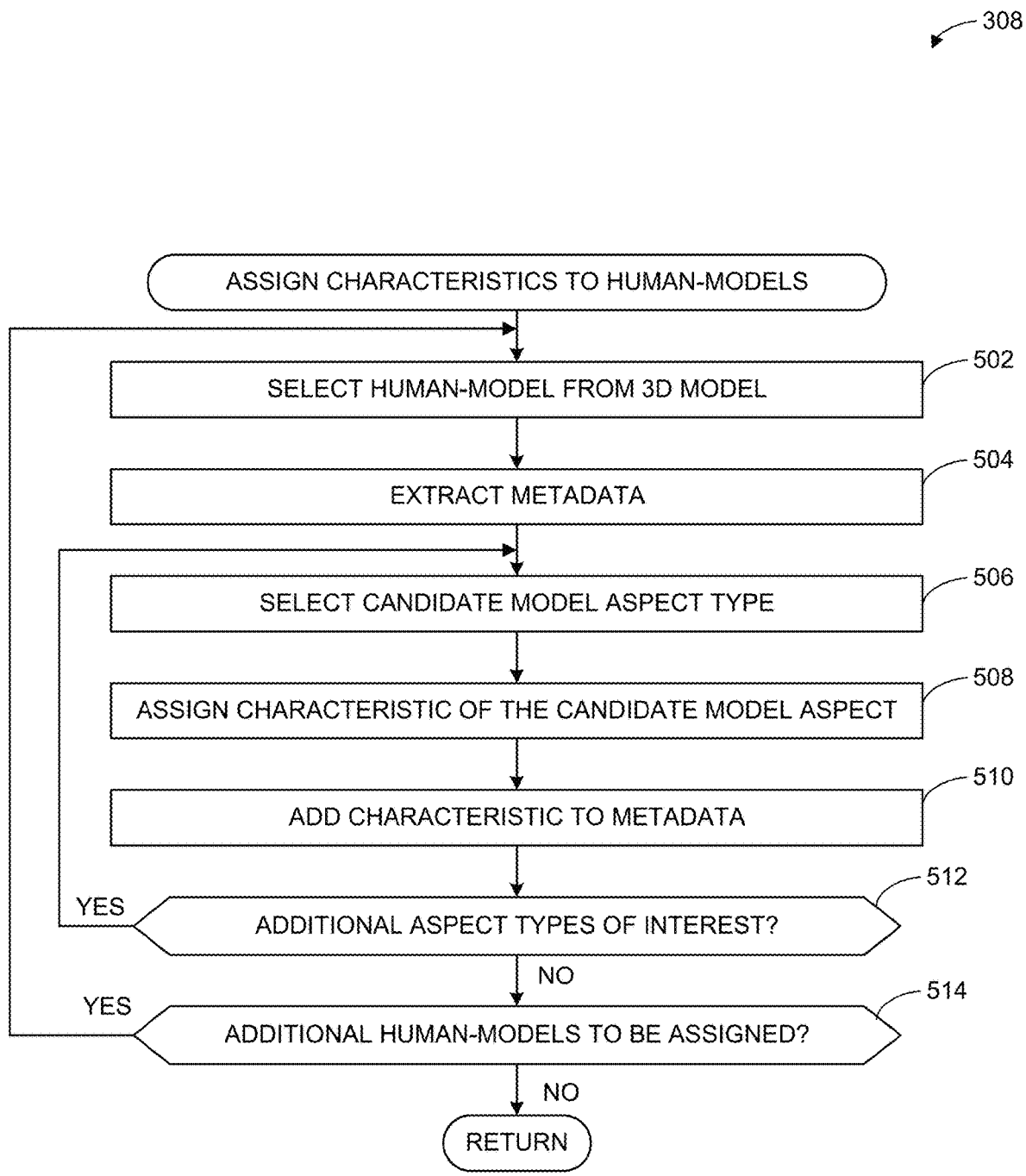

FIG. 5 illustrates additional detail associated with efforts by the example model aspect manager 114 to assign characteristics to human models (block 308). In the illustrated example of FIG. 5, the example model aspect manager 114 selects one of the placed candidate human models from the 3D map (block 502). The example metadata manager 116 extracts any available metadata associated with the selected human model (block 504), and the model characteristic modifier 118 selects a candidate model aspect type (block 506). As described above, each aspect type of interest may have any number of corresponding characteristics that define human models. The model characteristic modifier 118 assigns a characteristic of the selected aspect type of interest to the human model (block 508). In some examples, the characteristic assignment is performed with the aid of a random number generator so that various characteristics of human models exhibit a degree of variation that is more similar to crowd diversification expectations. The example metadata manager 116 adds the assigned characteristic to metadata associated with the selected human model (block 510), and the example model characteristic modifier 118 determines whether there are additional aspect types of interest to be considered when assigning characteristics to the selected human model (block 512). If so, then control returns to block 506, otherwise the example model aspect manager 114 determines whether there are additional human models to which characteristics should be assigned (block 514). If so, then control returns to block 502, otherwise the example program 308 of FIG. 5 returns to block 310 of FIG. 3.

Figure 6:
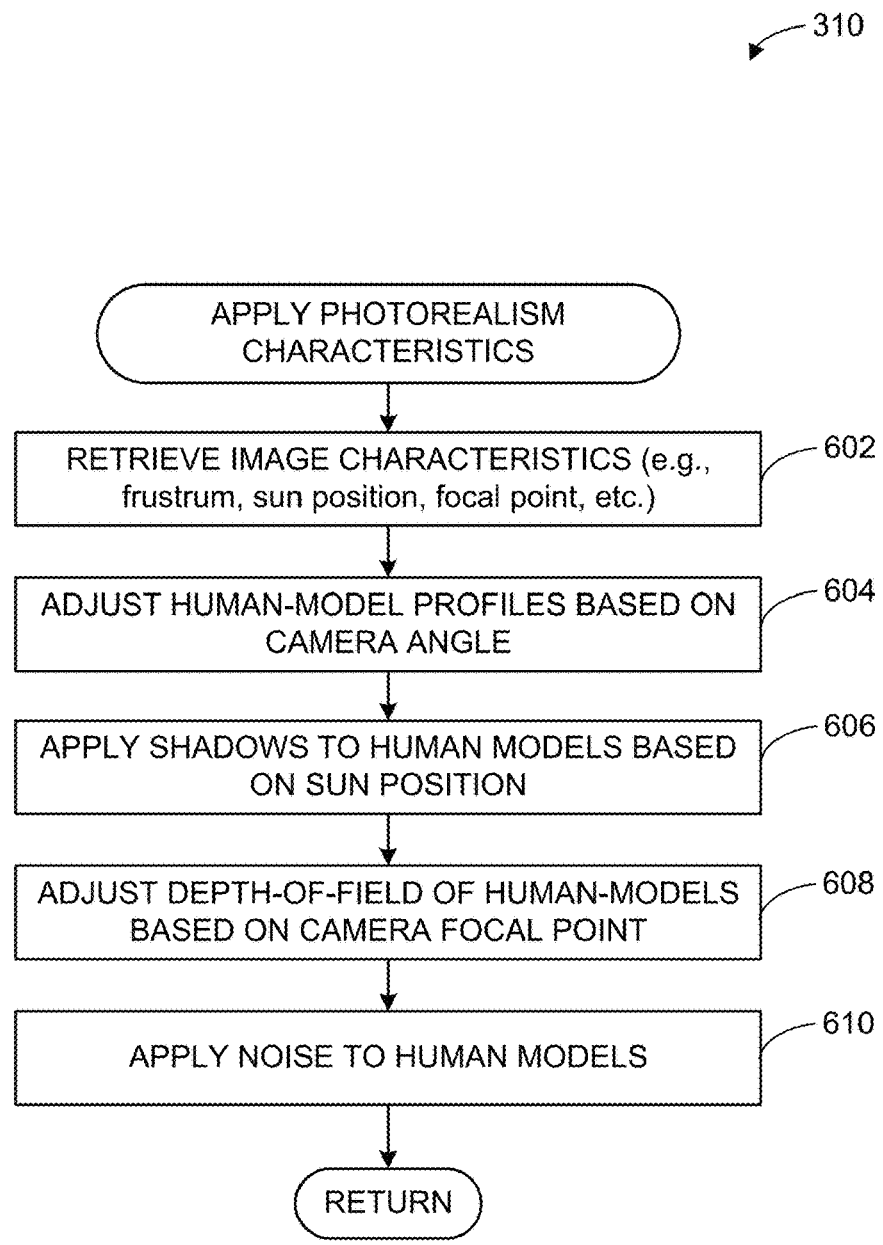

FIG. 6 includes additional detail corresponding to efforts by the example photorealism adjustor 126 to apply photorealism characteristics to the human models and/or 3D model (block 310). In the illustrated example of FIG. 6, the example image data determiner 128 retrieves image characteristics associated with the original image(s) of the scene of interest (block 602). The example profile adjustor 130 adjusts a profile setting(s) of human models based on camera angle information of the retrieved images characteristics (block 604). The example shadow adjustor 132 applies shadows to the human models based on lighting condition information (block 606), if any. In some examples the lighting condition information corresponds to a position of the sun when the original image of the scene of interest was taken, thereby allowing a proper shadow creation/adjustment by the example shadow adjustor 132. The example depth of field adjustor 134 adjusts depth-of-field characteristics of the human models (block 608) based on, for example, camera focal point information, and the example noise adjustor 136 applies various noise artifacts to the human models to improve a degree of photorealism (block 610). Control then returns to block 312 of FIG. 3 where the example map builder 104 overlays the originally captured image(s) on the 3D model.

Figure 7:
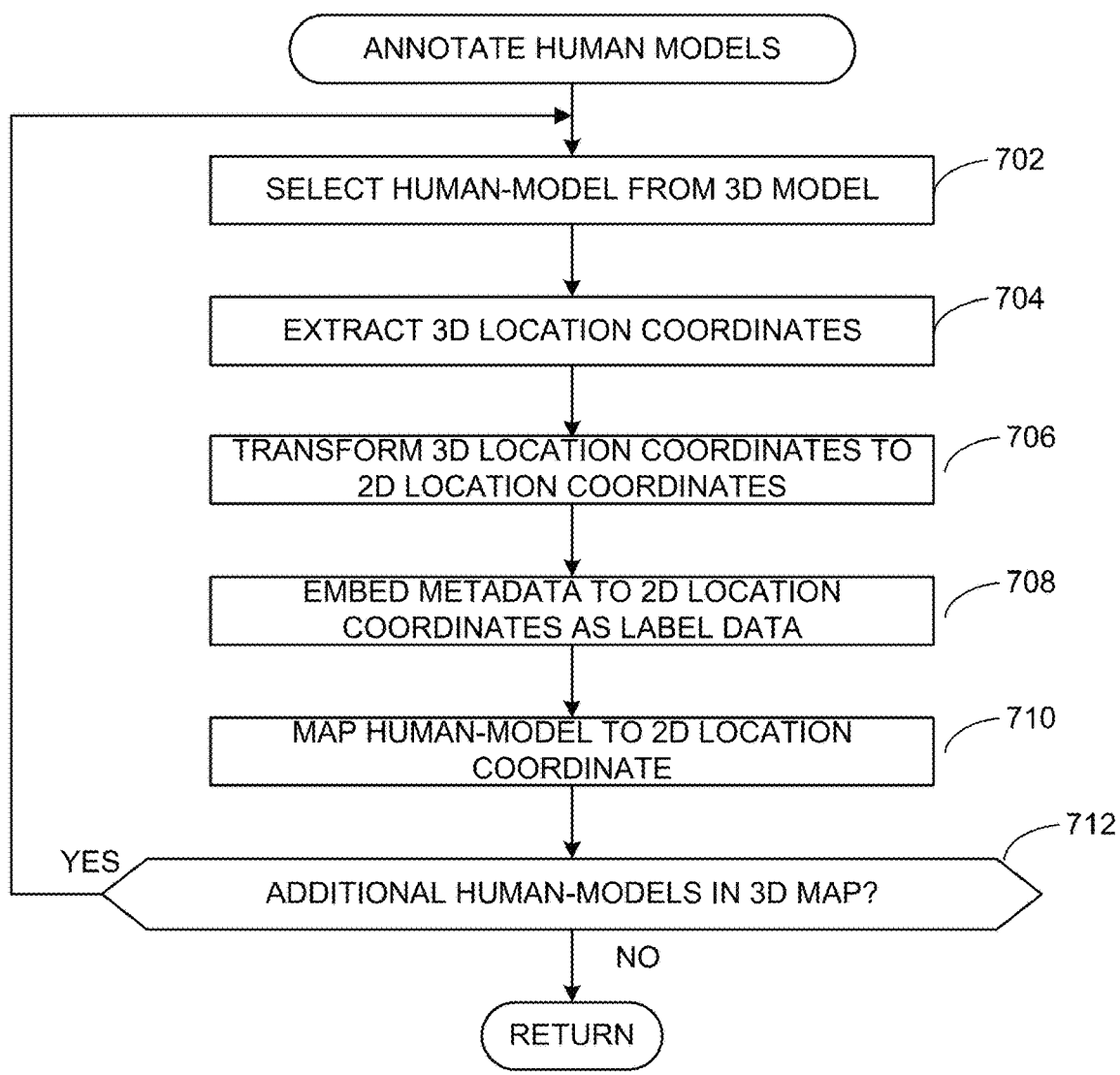

FIG. 7 illustrates additional detail corresponding to efforts of the example annotation manager 138 to annotate the human models (block 314). In the illustrated example of FIG. 7, the example model aspect manager 114 selects one of the human models from the 3D model/map (block 702). As described above, all of the inserted human models are now associated with coordinate information (e.g., cartesian x, y, z coordinates, rotational positioning coordinates) and characteristic information (e.g., particular characteristics associated with different aspect types). The example coordinate engine 108 extracts such 3D coordinate information (block 704), and the example transformation engine 140 transforms the 3D location coordinates into 2D coordinates (block 706). As described above, the example transformation engine 140 may normalize the 3D coordinates in a manner consistent with example Equation 1. Any metadata (e.g., characteristics data) previously associated with the human models of the 3D human model are embedded by the example metadata manager 116 to the 2D location coordinates (block 708), which may be used as label data for machine learning purposes. Additionally, the example transformation engine 140 maps the human model to the synthetic map with references to the 2D location coordinates (block 710). The example model aspect manager 114 determines whether there are additional human models in the 3D map (block 712) and, if so, control returns to block 702 to select a next available human model for 2D transformation.

Figure 8:
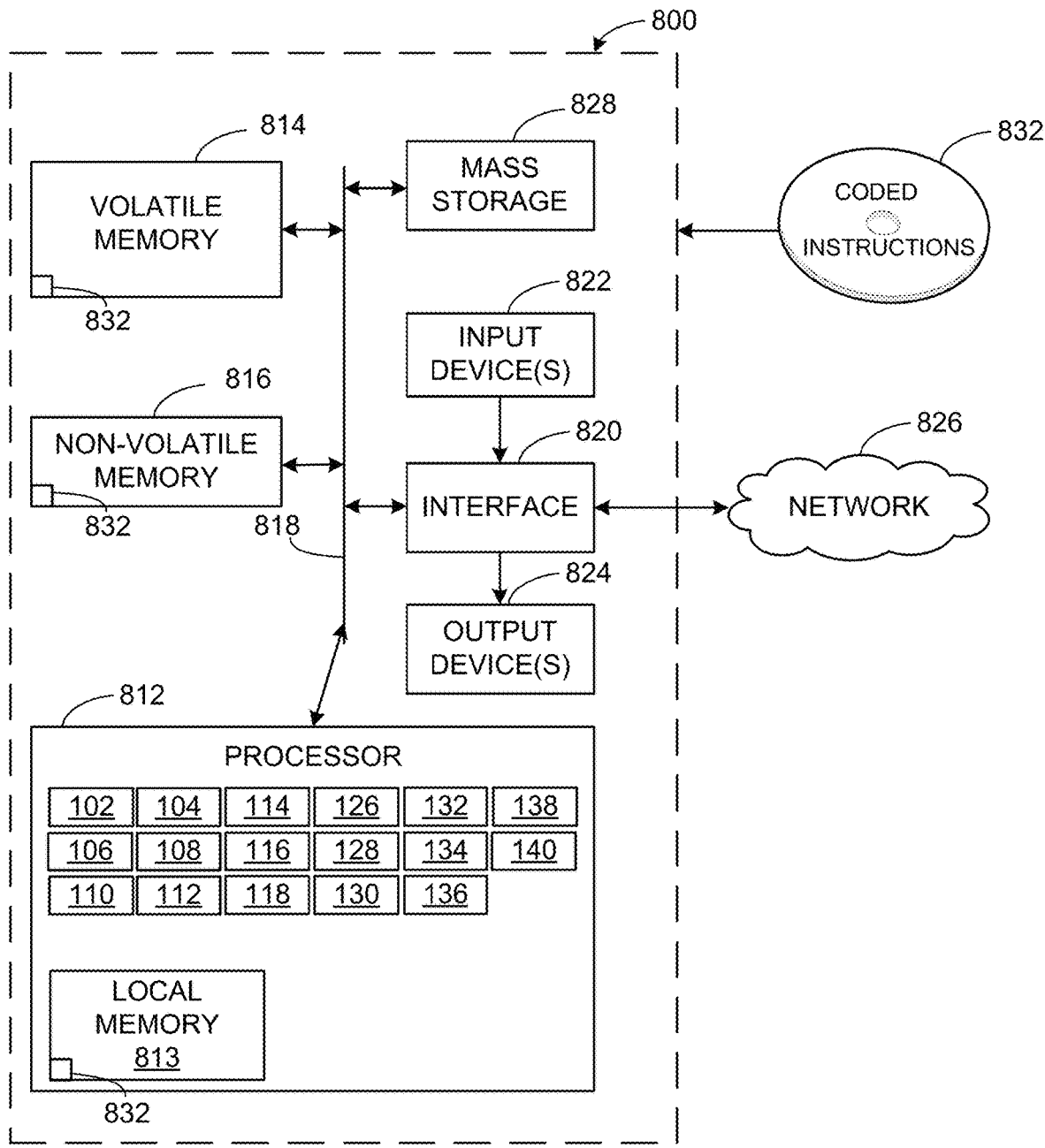
FIG. 8 is a block diagram of an example processing platform structured to execute the instructions of FIGS. 3-7 to implement the example digital scene generator of FIG. 1.

FIG. 8 is a block diagram of an example processor platform 800 structured to execute the to implement the digital scene generator 102 of FIG. 2. The processor platform 800 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example map builder 104, the example human model builder 106, the example coordinate engine 108, the example zone selector 110, the example grouping classifier 112, the example model aspect manager 114, the example metadata manager 116, the example model characteristic modifier 118, the example photorealism adjustor 126, the example image data determiner 128, the example profile adjustor 130, the example shadow adjustor 132, the example depth of field adjustor 134, the example noise adjustor 136, the example annotation manager 138, the example transformation engine, and the example digital scene generator 102.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 3-7 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that avoid privacy issues typically associated with image data acquired from public sources (e.g., CCTV cameras) when attempting to amass large quantities of crowd data for machine learning purposes. Additionally, examples disclosed herein prevent errors caused by human discretion when annotating and/or otherwise labelling items for use by machine learning training operations.

Example methods, apparatus, systems, and articles of manufacture to generate digital scenes are disclosed herein. Further examples and combinations thereof include the following:

Example 1 includes an apparatus to generate labelled models, the apparatus comprising a map builder to generate a three-dimensional (3D) model of an input image, a grouping classifier to identify a first zone of the 3D model corresponding to a first type of grouping classification, a human model builder to generate a quantity of placeholder human models corresponding to the first zone, a coordinate engine to assign the quantity of placeholder human models to respective coordinate locations of the first zone, the respective coordinate locations assigned based on the first type of grouping classification, a model characteristics modifier to assign characteristics associated with an aspect type to respective ones of the quantity of placeholder human models, and an annotation manager to associate the assigned characteristics as label data for respective ones of the quantity of placeholder human models.

Example 2 includes the apparatus as defined in example 1, wherein the map builder is to generate a geolocated point cloud of coordinate points as the 3D model of the input image.

Example 3 includes the apparatus as defined in example 1, wherein the grouping classifier is to interpret a painted region of the 3D model based on a color of the first zone, the color indicative of the first type of grouping classification.

Example 4 includes the apparatus as defined in example 1, wherein the first type of grouping classification corresponds to a first threshold distance between respective ones of the quantity of placeholder human models in the first zone.

Example 5 includes the apparatus as defined in example 4, wherein the grouping classifier is to identify a second zone of the 3D model corresponding to a second type of grouping classification, the second type of grouping classification corresponding to a second threshold distance between respective ones of a second quantity of placeholder human models in the second zone.

Example 6 includes the apparatus as defined in example 1, wherein the coordinate engine is to assign the quantity of placeholder human models in a manner devoid of the characteristics associated with the aspect type.

Example 7 includes the apparatus as defined in example 1, wherein the coordinate engine is to assign a directional orientation to the respective ones of the placeholder human models based on the first type of grouping classification.

Example 8 includes a non-transitory computer readable medium comprising computer readable instructions that, when executed, cause at least one processor to generate a three-dimensional (3D) model of an input image, identify a first zone of the 3D model corresponding to a first type of grouping classification, generate a quantity of placeholder human models corresponding to the first zone, assign the quantity of placeholder human models to respective coordinate locations of the first zone, the respective coordinate locations assigned based on the first type of grouping classification, assign characteristics associated with an aspect type to respective ones of the quantity of placeholder human models, and associate the assigned characteristics as label data for respective ones of the quantity of placeholder human models.

Example 9 includes the computer readable medium as defined in example 8, wherein the instructions, when executed, cause the at least one processor to generate a geolocated point cloud of coordinate points as the 3D model of the input image.

Example 10 includes the computer readable medium as defined in example 8, wherein the instructions, when executed, cause the at least one processor to interpret a painted region of the 3D model based on a color of the first zone, the color indicative of the first type of grouping classification.

Example 11 includes the computer readable medium as defined in example 8, wherein the instructions, when executed, cause the at least one processor to assign a first threshold distance between respective ones of the quantity of placeholder human models in the first zone based on the first type of grouping classification.

Example 12 includes the computer readable medium as defined in example 11, wherein the instructions, when executed, cause the at least one processor to identify a second zone of the 3D model corresponding to a second type of grouping classification, the second type of grouping classification corresponding to a second threshold distance between respective ones of a second quantity of placeholder human models in the second zone.

Example 13 includes the computer readable medium as defined in example 8, wherein the instructions, when executed, cause the at least one processor to assign the quantity of placeholder human models in a manner devoid of the characteristics associated with the aspect type.

Example 14 includes the computer readable medium as defined in example 8, wherein the instructions, when executed, cause the at least one processor to assign a directional orientation to the respective ones of the placeholder human models based on the first type of grouping classification.

Example 15 includes a computer implemented method to generate labelled models, the method comprising generating, by executing an instruction with at least one processor, a three-dimensional (3D) model of an input image, identifying, by executing an instruction with the at least one processor, a first zone of the 3D model corresponding to a first type of grouping classification, generating, by executing an instruction with the at least one processor, a quantity of placeholder human models corresponding to the first zone, assigning, by executing an instruction with the at least one processor, the quantity of placeholder human models to respective coordinate locations of the first zone, the respective coordinate locations assigned based on the first type of grouping classification, assigning, by executing an instruction with the at least one processor, characteristics associated with an aspect type to respective ones of the quantity of placeholder human models, and associating, by executing an instruction with the at least one processor, the assigned characteristics as label data for respective ones of the quantity of placeholder human models.

Example 16 includes the method as defined in example 15, further including generating a geolocated point cloud of coordinate points as the 3D model of the input image.

Example 17 includes the method as defined in example 15, further including interpreting a painted region of the 3D model based on a color of the first zone, the color indicative of the first type of grouping classification.

Example 18 includes the method as defined in example 15, wherein the first type of grouping classification corresponds to a first threshold distance between respective ones of the quantity of placeholder human models in the first zone.

Example 19 includes the method as defined in example 18, further including identifying a second zone of the 3D model corresponding to a second type of grouping classification, the second type of grouping classification corresponding to a second threshold distance between respective ones of a second quantity of placeholder human models in the second zone.

Example 20 includes the method as defined in example 15, further including assigning the quantity of placeholder human models in a manner devoid of the characteristics associated with the aspect type.

Example 21 includes the method as defined in example 15, further including assigning a directional orientation to the respective ones of the placeholder human models based on the first type of grouping classification.

Example 22 includes an apparatus to generate labelled models, the apparatus comprising means for map building to generate a three-dimensional (3D) model of an input image, means for grouping to identify a first zone of the 3D model corresponding to a first type of grouping classification, means for human model building to generate a quantity of placeholder human models corresponding to the first zone, means for coordinate assigning to assign the quantity of placeholder human models to respective coordinate locations of the first zone, the respective coordinate locations assigned based on the first type of grouping classification, means for model characteristics modification to assign characteristics associated with an aspect type to respective ones of the quantity of placeholder human models, and means for annotation to associate the assigned characteristics as label data for respective ones of the quantity of placeholder human models.

Example 23 includes the apparatus as defined in example 22, wherein the map building means is to generate a geolocated point cloud of coordinate points as the 3D model of the input image.

Example 24 includes the apparatus as defined in example 22, wherein the grouping means is to interpret a painted region of the 3D model based on a color of the first zone, the color indicative of the first type of grouping classification.

Example 25 includes the apparatus as defined in example 22, wherein the first type of grouping classification corresponds to a first threshold distance between respective ones of the quantity of placeholder human models in the first zone.

Example 26 includes the apparatus as defined in example 25, wherein the grouping means is to identify a second zone of the 3D model corresponding to a second type of grouping classification, the second type of grouping classification corresponding to a second threshold distance between respective ones of a second quantity of placeholder human models in the second zone.

Example 27 includes the apparatus as defined in example 22, wherein the coordinate assigning means is to assign the quantity of placeholder human models in a manner devoid of the characteristics associated with the aspect type.

Example 28 includes the apparatus as defined in example 22, wherein the coordinate assigning means is to assign a directional orientation to the respective ones of the placeholder human models based on the first type of grouping classification.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:
1. An apparatus to generate labelled models, the apparatus comprising:
  at least one memory;
  instructions in the apparatus; and
  processor circuitry to execute the instructions to instantiate:
    a map builder to generate a three-dimensional (3D) model of an input image;
    a grouping classifier to identify a first zone of the 3D model corresponding to a first type of grouping classification;

a human model builder to generate a quantity of placeholder human models corresponding to the first zone;

a coordinate engine to:
- assign the quantity of placeholder human models to respective coordinate locations of the first zone, the respective coordinate locations assigned based on the first type of grouping classification; and
- align a facial orientation when the first type of grouping classification corresponds to a co-dependency between the quantity of placeholder human models, the facial orientation of respective ones of the placeholder human models to be aligned based on a variation factor;

a model characteristics modifier to assign characteristics associated with an aspect type to respective ones of the quantity of placeholder human models; and an annotation manager to associate the assigned characteristics as label data for respective ones of the quantity of placeholder human models.

2. The apparatus as defined in claim 1, wherein the map builder is to generate a geolocated point cloud of coordinate points as the 3D model of the input image.

3. The apparatus as defined in claim 1, wherein the first type of grouping classification corresponds to a first threshold distance between respective ones of the quantity of placeholder human models in the first zone.

4. The apparatus as defined in claim 3, wherein the grouping classifier is to identify a second zone of the 3D model corresponding to a second type of grouping classification, the second type of grouping classification corresponding to a second threshold distance between respective ones of a second quantity of placeholder human models in the second zone.

5. The apparatus as defined in claim 1, wherein the coordinate engine is to assign the quantity of placeholder human models in a manner devoid of the characteristics associated with the aspect type.

6. The apparatus as defined in claim 1, wherein the processing circuitry is to execute the instructions to instantiate a random number generator to calculate the variation factor based on a threshold orientation value corresponding to a common reference focal point.

7. A non-transitory computer readable medium comprising computer readable instructions that, when executed, cause at least one processor to:
- generate a three-dimensional (3D) model of an input image;
- identify a first zone of the 3D model corresponding to a first type of grouping classification;
- generate a quantity of placeholder human models corresponding to the first zone;
- assign the quantity of placeholder human models to respective coordinate locations of the first zone, the respective coordinate locations assigned based on the first type of grouping classification;
- align a facial orientation when the first type of grouping classification corresponds to a co-dependency between the quantity of placeholder human models, the facial orientation of respective ones of the placeholder human models to be aligned based on a variation factor;
- assign characteristics associated with an aspect type to respective ones of the quantity of placeholder human models; and
- associate the assigned characteristics as label data for respective ones of the quantity of placeholder human models.

8. The computer readable medium as defined in claim 7, wherein the instructions, when executed, cause the at least one processor to generate a geolocated point cloud of coordinate points as the 3D model of the input image.

9. The computer readable medium as defined in claim 7, wherein the instructions, when executed, cause the at least one processor to assign a first threshold distance between respective ones of the quantity of placeholder human models in the first zone based on the first type of grouping classification.

10. The computer readable medium as defined in claim 9, wherein the instructions, when executed, cause the at least one processor to identify a second zone of the 3D model corresponding to a second type of grouping classification, the second type of grouping classification corresponding to a second threshold distance between respective ones of a second quantity of placeholder human models in the second zone.

11. The computer readable medium as defined in claim 7, wherein the instructions, when executed, cause the at least one processor to assign the quantity of placeholder human models in a manner devoid of the characteristics associated with the aspect type.

12. The computer readable medium as defined in claim 7, wherein the instructions, when executed, cause the at least one processor to calculate the variation factor based on a threshold orientation value corresponding to a common reference focal point.

13. A computer implemented method to generate labelled models, the method comprising:
- generating, by executing an instruction with at least one processor, a three-dimensional (3D) model of an input image;
- identifying, by executing an instruction with the at least one processor, a first zone of the 3D model corresponding to a first type of grouping classification;
- generating, by executing an instruction with the at least one processor, a quantity of placeholder human models corresponding to the first zone;
- assigning, by executing an instruction with the at least one processor, the quantity of placeholder human models to respective coordinate locations of the first zone, the respective coordinate locations assigned based on the first type of grouping classification;
- aligning, by executing an instruction with the at least one processor, a facial orientation when the first type of grouping classification corresponds to a co-dependency between the quantity of placeholder human models, the facial orientation of respective ones of the placeholder human models to be aligned based on a variation factor;
- assigning, by executing an instruction with the at least one processor, characteristics associated with an aspect type to respective ones of the quantity of placeholder human models; and
- associating, by executing an instruction with the at least one processor, the assigned characteristics as label data for respective ones of the quantity of placeholder human models.

14. The method as defined in claim 13, further including generating a geolocated point cloud of coordinate points as the 3D model of the input image.

15. The method as defined in claim 13, wherein the first type of grouping classification corresponds to a first threshold distance between respective ones of the quantity of placeholder human models in the first zone.

16. The method as defined in claim 15, further including identifying a second zone of the 3D model corresponding to a second type of grouping classification, the second type of grouping classification corresponding to a second threshold distance between respective ones of a second quantity of placeholder human models in the second zone.

17. The method as defined in claim 13, further including assigning the quantity of placeholder human models in a manner devoid of the characteristics associated with the aspect type.

18. The method as defined in claim 13, further including calculating the variation factor based on a threshold orientation value corresponding to a common reference focal point.

19. An apparatus to generate labelled models, the apparatus comprising:
   means for map building to generate a three-dimensional (3D) model of an input image;
   means for grouping to identify a first zone of the 3D model corresponding to a first type of grouping classification;
   means for human model building to generate a quantity of placeholder human models corresponding to the first zone;
   means for coordinate assigning to:
      assign the quantity of placeholder human models to respective coordinate locations of the first zone, the respective coordinate locations assigned based on the first type of grouping classification; and
      align a facial orientation when the first type of grouping classification corresponds to a co-dependency between the quantity of placeholder human models, the facial orientation of respective ones of the placeholder human models to be aligned based on a variation factor;
   means for model characteristics modification to assign characteristics associated with an aspect type to respective ones of the quantity of placeholder human models; and
   means for annotation to associate the assigned characteristics as label data for respective ones of the quantity of placeholder human models.

20. The apparatus as defined in claim 19, wherein the map building means is to generate a geolocated point cloud of coordinate points as the 3D model of the input image.

21. The apparatus as defined in claim 19, wherein the first type of grouping classification corresponds to a first threshold distance between respective ones of the quantity of placeholder human models in the first zone.

22. The apparatus as defined in claim 21, wherein the grouping means is to identify a second zone of the 3D model corresponding to a second type of grouping classification, the second type of grouping classification corresponding to a second threshold distance between respective ones of a second quantity of placeholder human models in the second zone.

23. The apparatus as defined in claim 19, wherein the coordinate assigning means is to assign the quantity of placeholder human models in a manner devoid of the characteristics associated with the aspect type.

24. The apparatus as defined in claim 19, wherein the means for coordinate assigning is to calculate the variation factor based on a threshold orientation value corresponding to a common reference focal point.

\* \* \* \* \*